US005785588A

United States Patent [19]
Jacobs et al.

[11] Patent Number: 5,785,588
[45] Date of Patent: Jul. 28, 1998

[54] DEVICE FOR REMOVING THE LAYER OF ABDOMINAL FAT OR LEAF FAT FROM A SLAUGHTERED ANIMAL

[75] Inventors: Thomas Gerardus Maria Jacobs, Doetinchem; Bernhard Antonius Maria Van Kippersluis, Winterswijk; Sander Antonie Van Ochten, Lichtenvoorde; Leonardus Jozephus Antonius Tiggeloven, Groenlo, all of Netherlands

[73] Assignee: Stork R.M.S. B.V., Netherlands

[21] Appl. No.: 542,978

[22] Filed: Oct. 13, 1995

[51] Int. Cl.⁶ ............................................. A22C 17/16
[52] U.S. Cl. ............................................. 452/134; 452/129
[58] Field of Search ............................. 452/134, 128, 452/129, 130

[56] References Cited

U.S. PATENT DOCUMENTS

| | | | |
|---|---|---|---|
| 4,275,481 | 6/1981 | Roberts et al. | 452/129 |
| 4,727,623 | 3/1988 | Durand | 452/134 |
| 4,873,749 | 10/1989 | Couturk | 452/128 |
| 4,901,398 | 2/1990 | Durand . | |
| 5,114,378 | 5/1992 | Montgomery | 452/128 |
| 5,129,856 | 7/1992 | Hahn et al. . | |
| 5,135,431 | 8/1992 | VanDen Nieuwelaar et al. | 452/117 |

FOREIGN PATENT DOCUMENTS

| | | |
|---|---|---|
| 0245183 | 11/1987 | European Pat. Off. . |
| 0330593 | 8/1989 | European Pat. Off. . |
| 0486099 | 5/1992 | European Pat. Off. . |
| 1065704 | 4/1967 | United Kingdom ................. 452/134 |

*Primary Examiner*—Willis Little
*Attorney, Agent, or Firm*—Webb Ziesenheim Burening Logsdon Orkin & Hanson, P.C.

[57] ABSTRACT

The invention relates to a device for removing the layer of abdominal fat or leaf fat from a slaughtered animal or a part thereof, for instance a pig, of which the abdominal cavity has been opened beforehand, which device has a gripping element for gripping the layer of abdominal fat or leaf fat in addition to a pulling element for pulling loose the layer from the abdominal wall, which gripping element includes at least one suction aperture.

In preference the pulling element includes a rotatably drivable winding mandrel which in provided with the at least one suction aperture, which winding mandrel is guided for winding up during rotary driving the layer of abdominal fat or leaf fat gripped by the suction aperture.

28 Claims, 3 Drawing Sheets

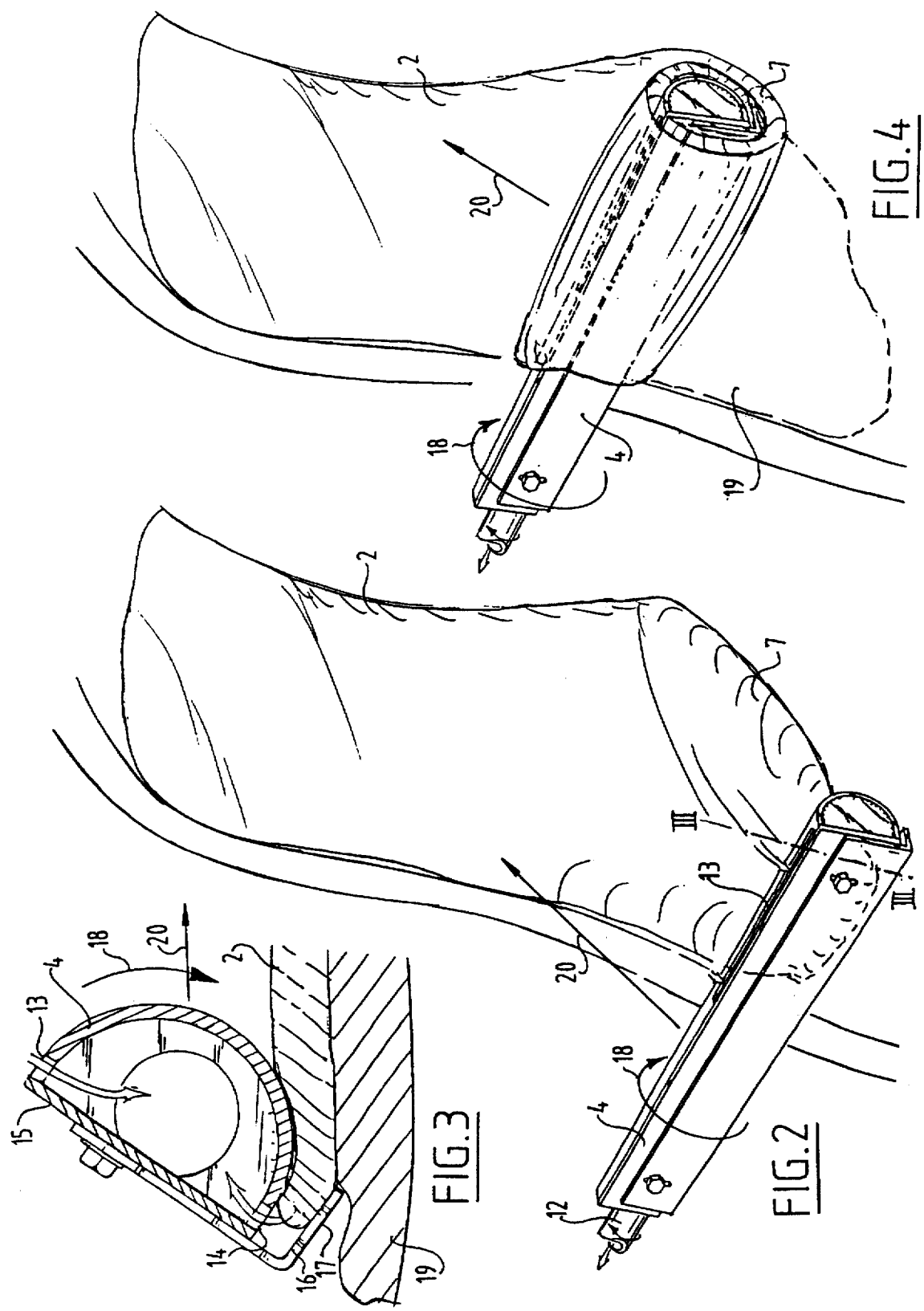

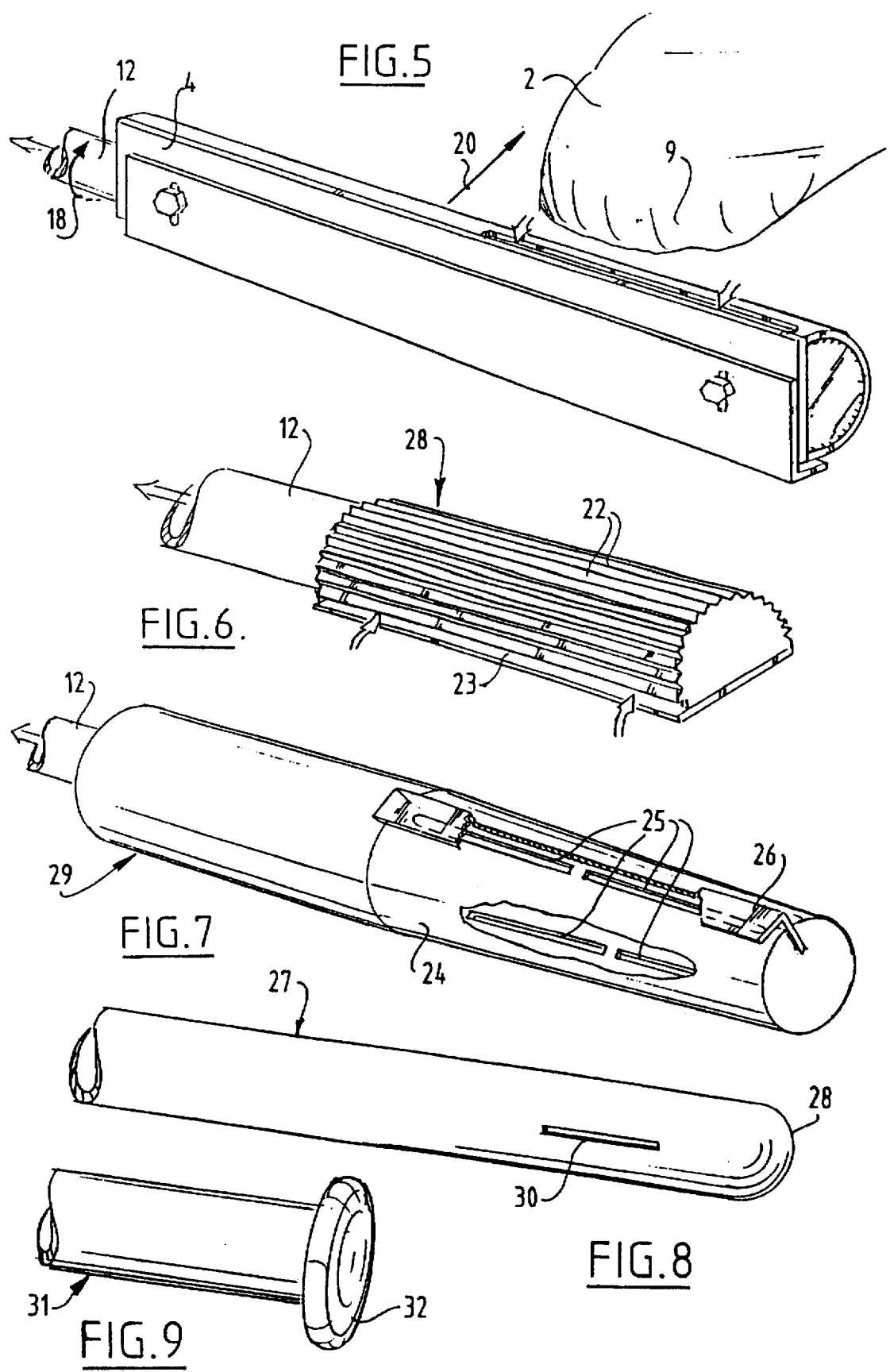

DEVICE FOR REMOVING THE LAYER OF ABDOMINAL FAT OR LEAF FAT FROM A SLAUGHTERED ANIMAL

BACKGROUND OF THE INVENTION

The invention lies in the field of removing the layer of abdominal fat or leaf fat from a slaughtered animal or a part thereof, for instance a pig, of which the abdominal cavity has been opened beforehand.

Devices suitable for this purpose are described in EP-A-0 245 183 and U.S. Pat. No. 5,129,856. The technique according to both these publications has a number of drawbacks. According to this prior known art the removal of the leaf fat from a slaughtered pig takes place by pulling the layer straight up from an end zone tapering more or less to a point. There is hereby a great danger of the leaf fat layer tearing during the stripping operation and a part of the leaf fat remaining behind in the slaughtered animal. The known art further requires a mechanically precise positioning in order to enable a correct gripping of the leaf fat layer.

It is an object of the invention to provide a device with which the said layer can be removed from the slaughtered animal very simply and reliably and on an industrial scale.

SUMMARY OF THE INVENTION

To this end the invention generally provides a device as according to claim 1.

The advantage of using a suction aperture is that the accuracy of positioning does not have to meet high requirements and is even relatively indifferent. In particular an embodiment as specified in claim 4 ensures a sufficiently great force to pull the layer of abdominal fat or leaf fat free of the abdominal wall during rotating drive of the winding mandrel and to wind it onto the mandrel.

A practical embodiment is specified in claim 2.

It is noted that in principle the suction aperture can take any suitable form. Use can for instance be made of a round opening with a diameter of for example 15 to 20 mm. Use can also be made of a slot aperture extending in lengthwise direction of the winding mandrel. Use can further be made of more than one opening.

Attention is drawn to the fact that a device for removing abdominal fat from slaughtered poultry is known from EP-A-0 486 099. Here the abdominal fat is removed substantially by suction only. Otherwise than according to the invention this known art makes no use of a gripping of the fat layer and a pulling loose procedure. The known device is thereby unsuitable for removing leaf fat for instance from a slaughtered pig.

It has been found that the steps according to claim 7 enable a comparatively easy removal of the layer of abdominal fat or leaf fat.

So that the mandrel is not impeded during its transverse translation by the protruding spinal column, an embodiment can be useful as specified in claim 8 in which the winding mandrel is in direct pressure contact with the layer for winding via the rolled up leaf fat.

The steps according to claim 9 enable an easy release of the rolled up layer, that is, by sliding it off axially.

Unintended sliding off is prevented by a device as according to claim 10.

The invention further relates to a device according to claim 11.

The device is preferably suitable for and used for removing a layer of abdominal fat or leaf fat.

The winding operation performed by the winding mandrel has great technical advantages.

Winding up can take place while taking up relatively little space. This in contrast to the gripping of the relevant layer and the pulling loose thereof by translation. It will be apparent that a relatively large free space must be available for this purpose.

Winding up has the further advantage that the distribution of force can be very uniform. A further advantage of winding up is that the mandrel can be adapted and placed such that the distance between the tear zone and the winding zone can be relatively small. This distance can even be minimal. In this latter case there is pressure contact between the mandrel and the surface to which the layer for removal is adhered, optionally via one or more already rolled up layers. This embodiment provides the option of processing the animal or a part thereof in the hanging position. Due to the described pressure contact no net sideways directed force is in any case exerted, whereby the animal for processing remains in position.

The steps according to claims 12, 13 and 14 can be applied for effective gripping of the relevant layer. The steps according to claim 15 in particular ensure a non-slip winding up after a first contact.

The layer for removal adjoins the midriff with an edge and has a first end zone tapering more or less to a point on the abdominal side and a second end zone tapering more or less to a point on the posterior side. These two zones are the most critical in the removal of the layer because of their tapering form. The steps according to claim 16 are intended to make the process as controllable as possible. Claim 17 gives steps enabling a smooth and reliable winding onto the winding mandrel without the danger of unintended tearing into the layer.

The steps as specified in claim 19 are intended to ensure that the winding mandrel does not meet any obstruction from the spinal column during the winding and the translation movement.

The invention further relates to a device according to claim 22. A reliable pulling loose is hereby ensured without there being a danger of unintended tearing into the layer.

Practical implementations hereof are given in claims 23, 24 and 25.

Claim 25 gives a preferred embodiment.

Claim 26 gives the option of placing the mandrel at very small distance from the layer for winding up and of even holding it in contact therewith. Pressure contact has the advantage that the processed slaughtered animal can be moved in suspended position without the pulling operation resulting in a sideways force being exerted on the animal.

Claim 27 provides the possibility of roughly following the form of the edge.

In combination herewith the variant of claim 28 is preferably applied.

BRIEF DESCRIPTION OF THE DRAWINGS

The invention will now be elucidated with reference to the annexed drawings, wherein:

FIG. 2 shows on enlarged scale the detail II of FIG. 1;

FIG. 3 shows the cross section III—III of FIG. 2;

FIG. 4 shows a perspective view corresponding with FIG. 2 during a subsequent phase;

FIG. 5 is a perspective view of the winding mandrel according to the foregoing figures prior to the gripping;

FIG. 6 shows a second embodiment of a winding mandrel in perspective view;

FIG. 7 shows a third embodiment of a winding mandrel in perspective view;

FIG. 8 shows a fourth embodiment of a winding mandrel in perspective view; and

FIG. 9 shows a fifth embodiment of a winding mandrel in perspective view.

DESCRIPTION OF THE PREFERRED EMBODIMENTS

Figure 1:
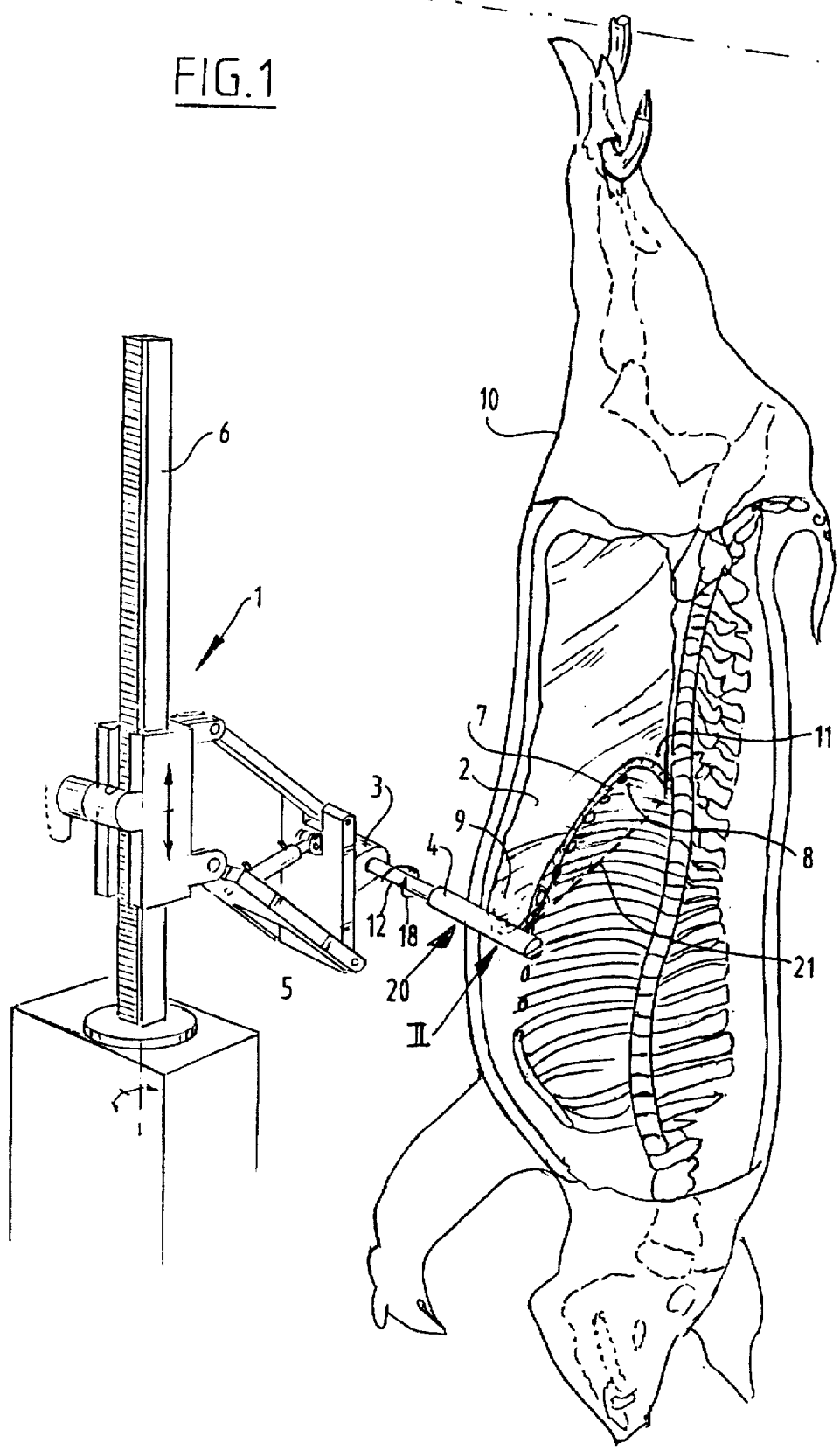
FIG. 1 shows a partly broken away perspective view of a device according to the invention at the start of a procedure.

FIG. 1 shows a device 1 for removing the leaf fat layer 2 from a pig of which in this case the chest cavity and abdominal cavity have been opened and the intestines removed.

The device comprises a winding mandrel 4 rotatably drivable by means of a motor 3 and supported by an adjustable frame 5 which is guided for up and downward movement by a vertically extending rail 6.

As shown in FIG. 1, the leaf fat layer is adhered with a curving edge 7 with increased adhesive force to the midriff 8 and has a first end zone 9 tapering more or less to a point on the abdominal side of the pig 10 and a second end zone 11 tapering more or less to a point on the back side of the pig 10.

The winding mandrel 4 is adapted and placed in the drawn embodiment for gripping the first end zone 9.

FIG. 2 shows the winding mandrel 4 on enlarged scale. This is supported by a hollow shaft 12 which is connected to a suction pump (not shown). The mandrel 4 itself also takes a hollow form and has two suction apertures embodied as slotted holes 13 and 14. See also FIG. 3 in this respect.

As FIG. 3 shows, the winding mandrel 4 has a roughly semi-cylindrical form with a flat longitudinal wall 15 which carries a bent plate 16. The combination of the slotted hole 14 and the bent portion 17 of plate 16 ensures that end zone 9 is effectively sucked in.

It is noted that the bent plate can also have an opposing orientation. It is possible to achieve hereby that the force exerted by the mandrel on the leaf fat layer can rapidly become greater after gripping thereof because the bent plate applies a relatively great local pressure on the gripping zone, which improves the reliability of the connection.

FIG. 4 shows the manner in which by rotary driving as according to arrow 18 the layer 2 is wound onto the winding mandrel 4 while simultaneously being pulled free from the abdominal wall 19.

FIG. 1 shows that the translation direction 20 of winding mandrel 4 corresponds, with relatively small variation, with the direction of the chord 21 between end zones 9 and 11. The leaf fat layer 2 is hereby pulled loose such that the tear zone resulting during tearing displaces continuously along the edge 7.

FIG. 5 shows the situation in which the winding mandrel 4 approaches the first end zone 9.

FIG. 6 shows a winding mandrel 28 which differs from winding mandrel 4 insofar that it is has an outer surface provided with ribs 22. The suction force applied to the first end zone 9 can herewith be effectively increased, as it were, by a locally increased pressure on the layer 2.

FIG. 7 shows a winding mandrel 29 with a slightly tapering end zone 24. Due to this shape the rolled up leaf fat layer 2 can easily be released by axial sliding. This embodiment also comprises suction apertures 25. A bent plate 26 is also used.

FIG. 8 shows a winding mandrel 27 with a rounded end 28. This mandrel has a more or less smooth outer surface and is provided with one suction aperture 30 in the form of a slotted hole with a length of about 50 mm and a width of about 3 mm.

FIG. 9 shows a winding mandrel 31 with a widened end 32. Otherwise than in the case of the winding mandrels described in the foregoing, as will be apparent, the rolled up leaf fat cannot be pushed off by axial displacement of the mandrel. The advantage of this mandrel is that an unintended and undesired sliding off is therefore blocked. The drawback is that the rolled up leaf fat layer 2 can only be removed by being unwound.

We claim:

1. A device for removing a layer of fat from at least a part of a slaughtered animal, which device comprises:
   gripping means for gripping the layer of fat; and
   pulling means for pulling loose the layer of fat from an abdominal wall,
   wherein the gripping means comprises at least one suction aperture and wherein the gripping means is located on the pulling means.

2. The device as claimed in claim 1, wherein the pulling means comprises a rotatably drivable winding mandrel which is provided with the at least one suction aperture, which winding mandrel is guided during rotary driving for winding up the layer of fat gripped by the suction aperture.

3. The device as claimed in claim 2, wherein the suction aperture has a surface area of at least 1.5 cm$^2$.

4. The device as claimed in claim 1, wherein the pulling means further comprises clamping means which co-act with the suction aperture.

5. The device as claimed in claim 1, wherein the suction aperture has an elevated peripheral edge.

6. The device as claimed in claim 2, wherein the winding mandrel has a peripheral surface with a profiled form such that the grip on the layer of fat is strengthened.

7. The device as claimed in claim 2, wherein the winding mandrel includes a free end zone and the free end zone of the winding mandrel is movable in a lengthwise direction.

8. The device as claimed in claim 2, wherein the winding mandrel has a free end and a slightly tapering shape toward the free end.

9. The device as claimed in claim 2, wherein the winding mandrel has a widened end.

10. A device for removing a layer on an accessible surface of at least a part of a slaughtered animal, which layer comprises at least one of subcutaneous fat, skin, abdominal fat and leaf fat, which device comprises:
    gripping means for gripping the layer, wherein the gripping means comprises at least one suction aperture; and
    pulling means for pulling the layer loose of the surface, which pulling means comprises:
    a rotatably drivable winding mandrel which carries the gripping means and is configured to wind up the layer during rotary driving.

11. The device as claimed in claim 10, wherein the mechanical means comprises clamping means.

12. The device as claimed in claim 10, wherein the suction aperture has an elevated peripheral edge.

13. The device as claimed in claim 10, wherein the gripping means comprises mechanical means.

14. The device as claimed in claim 10, wherein the winding mandrel has a peripheral surface with a profiled form such that the grip on the layer is strengthened.

15. The device as claimed in claim 10, wherein the layer includes a tapering end zone and the gripping means is controlled so as to grip the tapering end zone of the layer.

16. The device as claimed in claim 10, wherein the mandrel includes a free end zone and the free end zone of the winding mandrel is movable in a lengthwise direction.

17. The device as claimed in claim 10, wherein the winding mandrel has a free end and a slightly tapering shape towards the free end.

18. The device as claimed in claim 10, wherein the winding mandrel has a widened end.

19. A device for removing a layer of fat from at least a part of a slaughtered animal, which layer adjoins a midriff with an edge and has a first end zone tapering substantially to a point on an abdominal side of the animal and a second end zone tapering substantially to a point on a back side of the animal, which device comprises:

gripping means for gripping at least one of the end zones, wherein the gripping means comprises at least one suction aperture; and pulling means for pulling loose the layer of fat in a direction such that a tear zone occurring during pulling moves continuously along the edge.

20. The device as claimed in claim 19, wherein the pulling means are configured to pull loose the layer from one of the end zones in a direction which corresponds within about 30° to a direction of a chord between the end zones of the edge.

21. The device as claimed in claim 19, wherein the pulling means are configured to pull loose the layer from one of the end zones in a direction which differs by at least 10° from a principal direction of the spinal column of the animal.

22. The device as claimed in claim 19, wherein the pulling means are configured to displace both said end zones such that the tear zone extends substantially parallel to a chord between both end zones.

23. The device as claimed in claim 19, wherein the pulling means comprises a rotatably drivable winding mandrel for coupling to at least one of the end zones by means of the gripping means, which mandrel winds up the layer of fat during rotary driving.

24. The device as claimed in claim 23, wherein during the winding operation the winding mandrel performs a corresponding transverse translation.

25. The device as claimed in claim 23, wherein the rotatably drivable winding mandrel is pivotable such that the tear zone extends substantially transversely of the edge.

26. The device as claimed in claim 25, wherein the winding mandrel has a free end, a form configured to the pivotability and widening toward the free end.

27. The device as claimed in claim 22, wherein the winding mandrel is guided to perform a winding operation under pressure contact between a chest wall and the winding mandrel substantially via the layer of fat already wound on the winding mandrel.

28. A device for removing a layer on an accessible surface of at least a part of a slaughtered animal, which layer comprises at least one of subcutaneous fat, skin, abdominal fat and leaf fat, which device comprises:

gripping means for gripping the layer; and pulling means for pulling the layer loose of the surface, which pulling means comprises a rotatable drivable winding mandrel which carries the gripping means and is configured to wind up the layer during rotary driving, and wherein the winding mandrel is configured to perform a transverse translation which corresponds within about 30° to a direction of a chord between tapering end zones of an edge of the layer adjoining a midriff of the animal.

* * * * *

UNITED STATES PATENT AND TRADEMARK OFFICE
CERTIFICATE OF CORRECTION

PATENT NO. : 5,785,588
DATED : July 28, 1998
INVENTOR(S) : Thomas Gerardus Maria Jacobs et al.

It is certified that error appears in the above-identified patent and that said Letters Patent is hereby corrected as shown below:

On the Title page, insert:
  --[30] Foreign Application Priority Data
     Oct. 13, 1994 [NL]  Netherlands........9401695--.

Signed and Sealed this

Second Day of February, 1999

Attest:

Attesting Officer

*Acting Commissioner of Patents and Trademarks*